(12) United States Patent
Oliver

(10) Patent No.: US 6,816,272 B2
(45) Date of Patent: *Nov. 9, 2004

(54) SYSTEM AND METHOD FOR SELECTIVELY DOWNLOADING DATA FILES FROM AN OPTICAL SCANNER

(75) Inventor: Thomas C Oliver, Windsor, CO (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,221

(22) Filed: May 13, 1999

(65) Prior Publication Data

US 2003/0184792 A1 Oct. 2, 2003

(51) Int. Cl.[7] .............................. G06F 15/00; G09G 5/00
(52) U.S. Cl. ........................ 358/1.15; 358/403; 345/838
(58) Field of Search ................................ 358/1.15, 1.1, 358/1.2, 1.17, 1.18, 403, 468, 442; 345/838; 348/333.05

(56) References Cited

U.S. PATENT DOCUMENTS

| | | | | | |
|---|---|---|---|---|---|
| 4,791,589 | A | * | 12/1988 | Blazo et al. | 364/518 |
| 5,121,131 | A | * | 6/1992 | Bouldin et al. | 346/1.1 |
| 5,699,458 | A | * | 12/1997 | Sprague | 382/250 |
| 5,717,940 | A | * | 2/1998 | Peairs | 715/515 |
| 5,761,655 | A | | 6/1998 | Hoffman | 707/4 |
| 5,825,044 | A | | 10/1998 | Allen et al. | 250/557 |
| 5,886,898 | A | * | 3/1999 | Choudhury et al. | 364/478.06 |
| 6,011,537 | A | * | 1/2000 | Slotznick | 345/115 |
| 6,118,116 | A | | 9/2000 | Sawada et al. | 250/208.1 |
| 6,134,017 | A | | 10/2000 | Schlank et al. | 358/1.15 |
| 6,335,742 | B1 | * | 1/2002 | Takemoto | 345/781 |
| 6,390,371 | B1 | * | 5/2002 | Armga et al. | 235/472.01 |
| 6,445,412 | B1 | * | 9/2002 | Shiohara | 348/222 |
| 2003/0107777 | A1 | * | 6/2003 | Yamade et al. | 358/442 |

FOREIGN PATENT DOCUMENTS

| | | |
|---|---|---|
| EP | 0978989 | 2/2000 |
| JP | 9153985 | 6/1997 |
| JP | 11069048 | 3/1999 |

OTHER PUBLICATIONS

Symbol Technologies, "LDT 3805 Laser Data and LRT 3800 Laser Radio Terminal Series", 1997, from www.symbol.com.

* cited by examiner

Primary Examiner—Edward Coles
Assistant Examiner—Joseph R. Pokrzywa

(57) ABSTRACT

A scanning system enables efficient and selective downloading of files. A scanning mechanism associated with the scanning system captures images of documents. Then, a translator analyzes the captured images to produce data files. When desired, a system controller of the scanning system transmits sufficient data from the data files such that thumbnail images of the data files can be produced. After viewing the thumbnail images, a user selects one of the data files, and the system controller transmits or downloads the selected data file in response. The selected data file can be transmitted to a computer system, which renders the selected data file to a user, or the selected data file can be transmitted directly to a printer, which prints an image of the selected data file.

8 Claims, 4 Drawing Sheets

SYSTEM AND METHOD FOR SELECTIVELY DOWNLOADING DATA FILES FROM AN OPTICAL SCANNER

BACKGROUND OF THE INVENTION

1. Field of the Invention

The present invention generally relates to data processing techniques and, in particular, to a system and method for selectively downloading data files from an optical scanner.

2. Related Art

Optical scanning systems exist in the art for creating software copies of documents. In this regard, conventional optical scanning systems are designed to capture an image of a document and to analyze the captured image to define digital data that corresponds to and defines the captured image. This digital data may then be transmitted to and stored in a conventional computer system, such as a personal computer (PC), capable of processing the data through well known techniques. For example, the computer system may render the data via a display screen that produces an electronic image of the scanned document, or the computer system may render the data via a printer that prints a copy of the scanned document. If desired, the data may be modified by the computer system.

Recently, some optical scanning systems have been designed as stand-alone, portable units. Therefore, a user may take a portable scanning system on a business trip, to a meeting, or to other types of events and scan documents while away from his PC. The portable scanning system includes memory that allows the data defined for each scanned document to be stored in a data file. Once the user returns to his PC, the user can connect the portable scanning system to the PC and download selected files.

In this regard, portable scanning systems are often designed to download all of the data files stored in memory at once. Therefore, a user connects the scanning system to a PC or other processing device and activates a button or switch to indicate that the data files should be downloaded. In response, the scanning system transmits the data defining each of the data files to the computer system and then deletes the data files from the memory within the scanning system.

In many instances, it is not efficient to download all of the data files stored in the scanning system at once, especially when only a small number of the data files is desired. Therefore, some portable scanning systems have been designed to allow the user to selectively download particular files from the scanning system rather than to download all of the files at once. These scanning systems usually include a relatively large (e.g., 50 mm×50 mm) display screen that is used to display an image corresponding with the stored data files. Therefore, the user selects one of the data files stored in the scanning system, and the scanning system renders the data of the selected data file via the display screen, which displays an image corresponding with the rendered data.

The user determines whether the selected file is one of the files that should be downloaded based on the image produced by the display screen. If the user wishes to download the selected file, the user activates another button or switch, and the scanning system, in response, transmits the selected data file to the computer system. However, if the user does not wish to download the selected file, the user selects another data file, which is then rendered to the display screen for viewing by the user. This process of selecting and rendering the stored data files to the display screen is repeated until the user has downloaded each desired file.

However, the display screens associated with these portable scanning systems increase the size and cost of the scanning systems. It is particularly desirable for the size of portable scanning systems to be minimized to facilitate transportation of the scanning systems. Thus, a heretofore unaddressed need exists in the industry for providing a portable optical scanning system and method that enables a user to selectively and efficiently download data files from the scanning system.

SUMMARY OF THE INVENTION

The present invention overcomes the inadequacies and deficiencies of the prior art as discussed hereinbefore. Generally, the present invention provides a scanning system and method that enables a user to selectively and efficiently download data files from the scanning system.

The present invention utilizes a scanning mechanism, a translator, an input device, and a system controller. The scanning mechanism scans documents and captures images of the documents during a scanning process. Then, the translator analyzes the captured images and produces data files based on the captured images. An input device receives thumbnail transmission requests and requests to download selected ones of the data files. The system controller transmits data from a plurality of data files in response to a thumbnail transmission request and transmits data from at least one of the data files in response to a request to download.

In accordance with another feature of the present invention, the scanning system also includes a display device. The system controller respectively associates the data files with a plurality of identifiers and selectively displays the identifiers via the display device based on inputs received from the input device. The system controller transmits the data from the one data file in response to a determination that an identifier associated with the one data file is being displayed by the display device when the request to download is received.

In accordance with another feature of the present invention, the system controller transmits the data from the data files via wireless signals.

In accordance with another feature of the present invention the system controller transmits the data from the data files directly to a printer.

The present invention can also be viewed as providing a method for enabling data to be efficiently and selectively downloaded from a scanning system. Briefly described, the method can be broadly conceptualized by the following steps: capturing images of documents; defining data files based on the images; storing the data files in memory; transmitting data from a plurality of the data files; receiving the data transmitted from the plurality of the data files; displaying thumbnail images based on the data received in the receiving step; selecting one of the thumbnail images; retrieving data from one of the data files based on the selecting step; transmitting the data retrieved in the retrieving step; and producing an image based on the data retrieved in the retrieving step.

Other features and advantages of the present invention will become apparent to one skilled in the art upon examination of the following detailed description, when read in conjunction with the accompanying drawings. It is intended that all such features and advantages be included herein within the scope of the present invention, as is defined by the claims.

BRIEF DESCRIPTION OF THE DRAWINGS

The invention can be better understood with reference to the following drawings. The elements of the drawings are

DETAILED DESCRIPTION OF THE PREFERRED EMBODIMENT

Generally described, the present invention is an optical scanning system and method for capturing images of documents and converting the images into data files. When desired, the scanning system transmits a portion of the data in each file or in selected files to an output device that renders the transmitted data to a user. Based on images produced by the data rendered to the user, the user selects at least one of the data files, and the scanning system then transmits or downloads the data defining the selected data file(s). Therefore, the user can selectively download the files stored within the scanning system.

Figure 1:
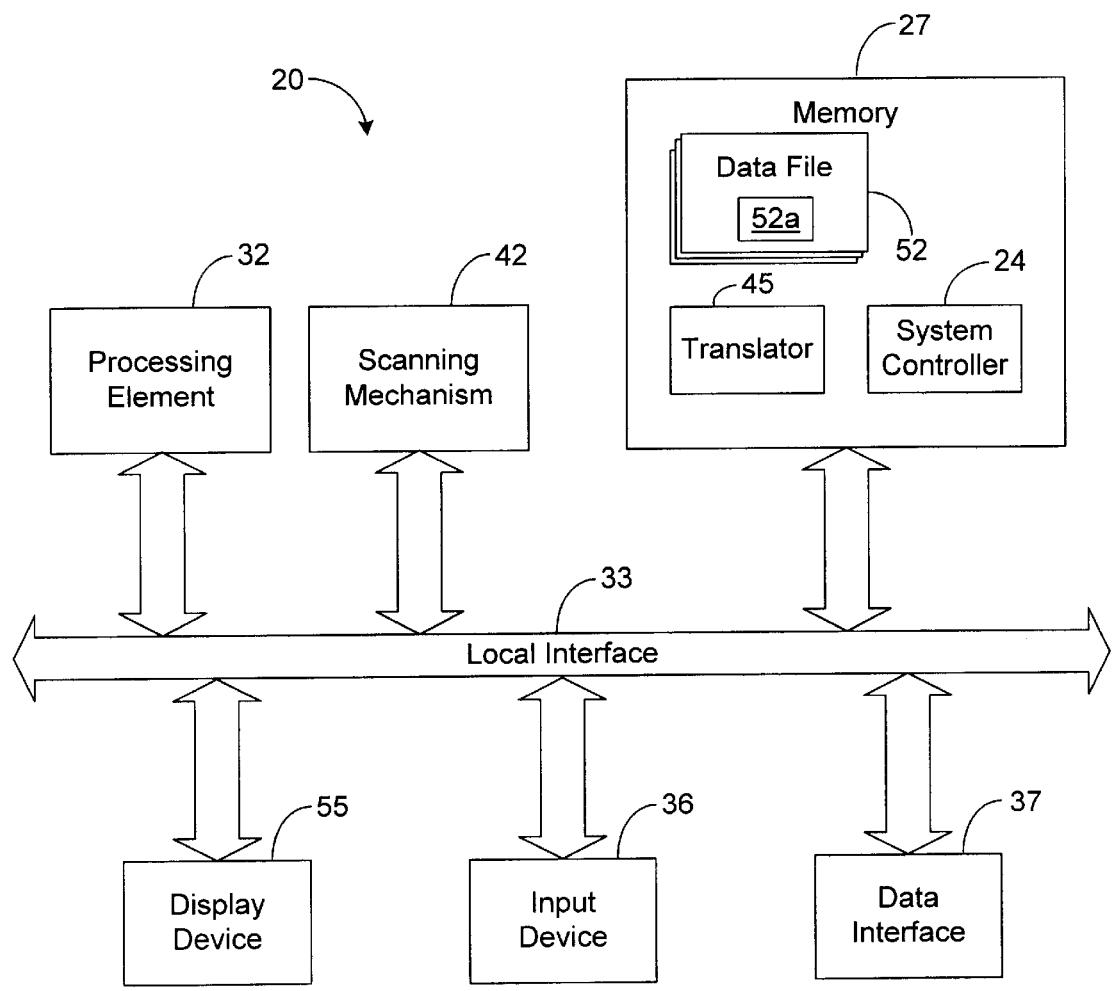
FIG. 1 is a block diagram illustrating a scanning system in accordance with the principles of the preferred embodiment of the present invention.

FIG. 1 depicts the scanning system 20 of the preferred embodiment of the present invention. The operation of the scanning system 20 is controlled by a system controller 24. The system controller 24 can be implemented in software, hardware, or a combination thereof. In the preferred embodiment, as illustrated by way of example in FIG. 1, the system controller 24 of the present invention along with its associated methodology is implemented in software and stored in memory 27 of system 20.

Note that the system controller 24, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the system controller 24 may be magnetically stored in flash memory.

The system 20 preferably includes one or more conventional processing elements 32, such as a digital signal processor (DSP), that communicate to and drive the other elements within the system 20 via a local interface 33, which can include one or more buses. Furthermore, an input device 36, for example, a keypad, can be used to input data from a user of the system 20. The system 20 preferably includes a data interface 37 that allows the system 20 to exchange data with external systems. The data interface 37 may be comprised of a serial RS-232 connection, infrared signal communication devices, and/or other types of conventional interface devices.

The preferred embodiment of the system 20 also includes a scanning mechanism 42 that is designed to capture images of documents through techniques well known in the art. Once an image of a document is captured, the system controller 24 is designed to invoke translator 45. Similar to system controller 24, the translator 45 can be implemented in hardware, software, or a combination thereof. In the preferred embodiment, the translator 45 is implemented in software and stored in memory 27 of system 20.

The translator 45 is configured to analyze an image captured by the scanning mechanism 42 and to define digital data corresponding to the captured image through techniques well known in the art. The translator 45 is preferably designed to store the digital data defining the captured image into memory 27 as a data file 52. The scanning device 42 and the translator 45, as well as the process for capturing an image and converting the captured image into a data file 52, are fully described in U.S. Pat. No. 5,825,044, which is incorporated herein by reference.

Once the translator 45 has defined a data file 52, the system controller 24 is configured to associate an identifier with the data file 52. In the preferred embodiment, the identifier is a number that is unique to the data file 52, although other types of identifiers are possible. For example, the system controller 24 can be configured to consecutively assign or associate a number for each data file 52, starting with the number "1." Therefore, the first file 52 produced by the translator 45 is associated with the number "1," the second file 52 produced by the translator 45 is associated with the number "2," the third file 52 produced by the translator 45 is associated with the number "3," etc.

After a data file 52 is associated with an identifier, the system controller 24 is preferably designed to transmit data defining the identifier to a display device 55, such as a liquid crystal display (LCD), for example. In response, the display device 55 is designed to render the data defining the identifier to the user. Therefore, except as otherwise indicated herein, the display device 55 continually renders the identifier associated with the data file 52 most recently produced by translator 45. As a result, the user can normally determine how many data files 52 have been produced by the translator 45 and are stored in memory 27 by analyzing the identifier currently displayed by the display device 55.

In this regard, the number of files 52 in memory 27 corresponds to the number shown by the display device 55. For example, assume that memory 27 includes ten data files 52. When the data files 52 are consecutively associated with a number as described hereinabove, the last data file 52 produced by the translator 45 is associated with the number "10," which is displayed by the display device 55. Therefore, the number displayed by the display device 55 (i.e., the number "10") indicates the number of data files 52 stored in memory 27.

Figure 2:
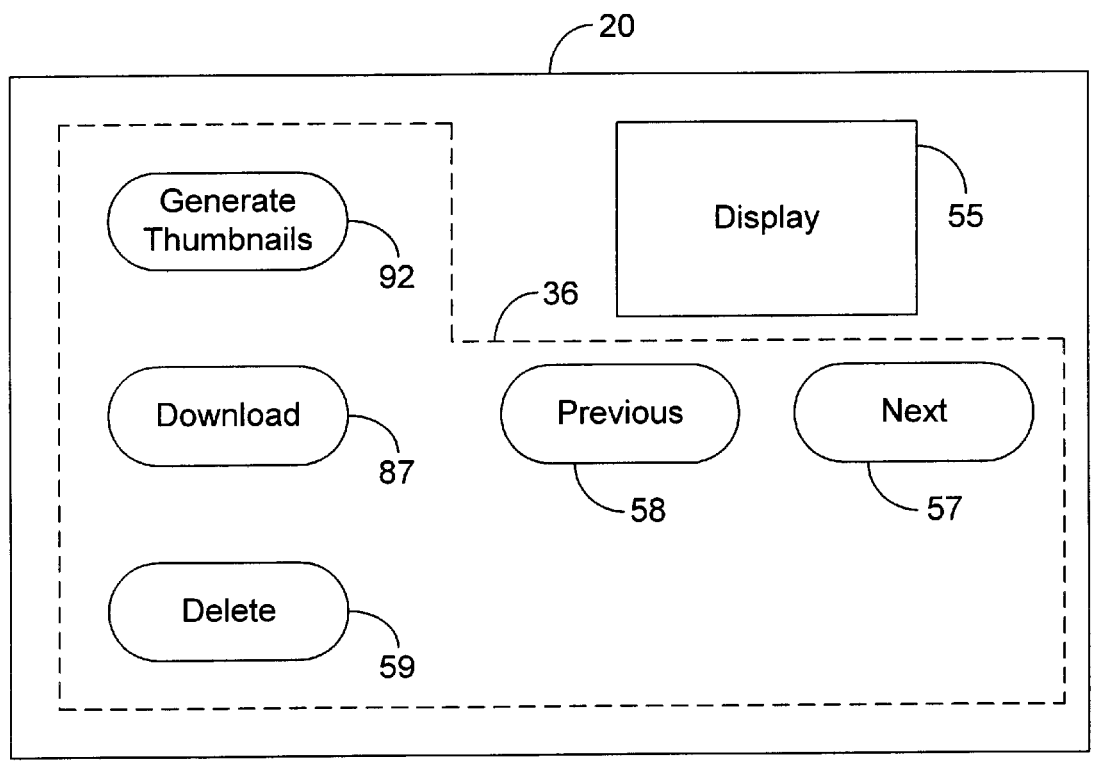
FIG. 2 is a schematic diagram illustrating a possible implementation of user interfaces for the scanning system of FIG. 1.

The user may delete one of the data files from memory 27, if desired. In this regard, the user preferably provides inputs via input device 36 that identify the file 52 to be deleted. As an example, the input device 36 may include a "next" button 57 and a "previous" button 58, as shown by FIG. 2. The display device 55 increments the number displayed by display device 55 in response to activation of the "next" button 57 and decrements the number displayed by display device 55 in response to activation of the "previous" button 58. When the number associated with the file 52 to be deleted is displayed, the user may then activate a "delete" button 59. In response, the system controller 24 is designed to delete the file 52 from memory 27 that is associated with the number or identifier displayed by the display device 55 when the "delete" button 59 is activated. Once the selected file 52 is deleted, each of the identifiers associated with files 52 that were produced after the deleted file 52 can be modified to account for the deletion of the data file 52. In the preferred embodiment, the identifiers are decremented by one. Once the deletion process is over, the system controller 24 preferably transmits data defining the identifier of the most recently produced file 52 to the display device 55, which renders this data to the user.

Figure 3:
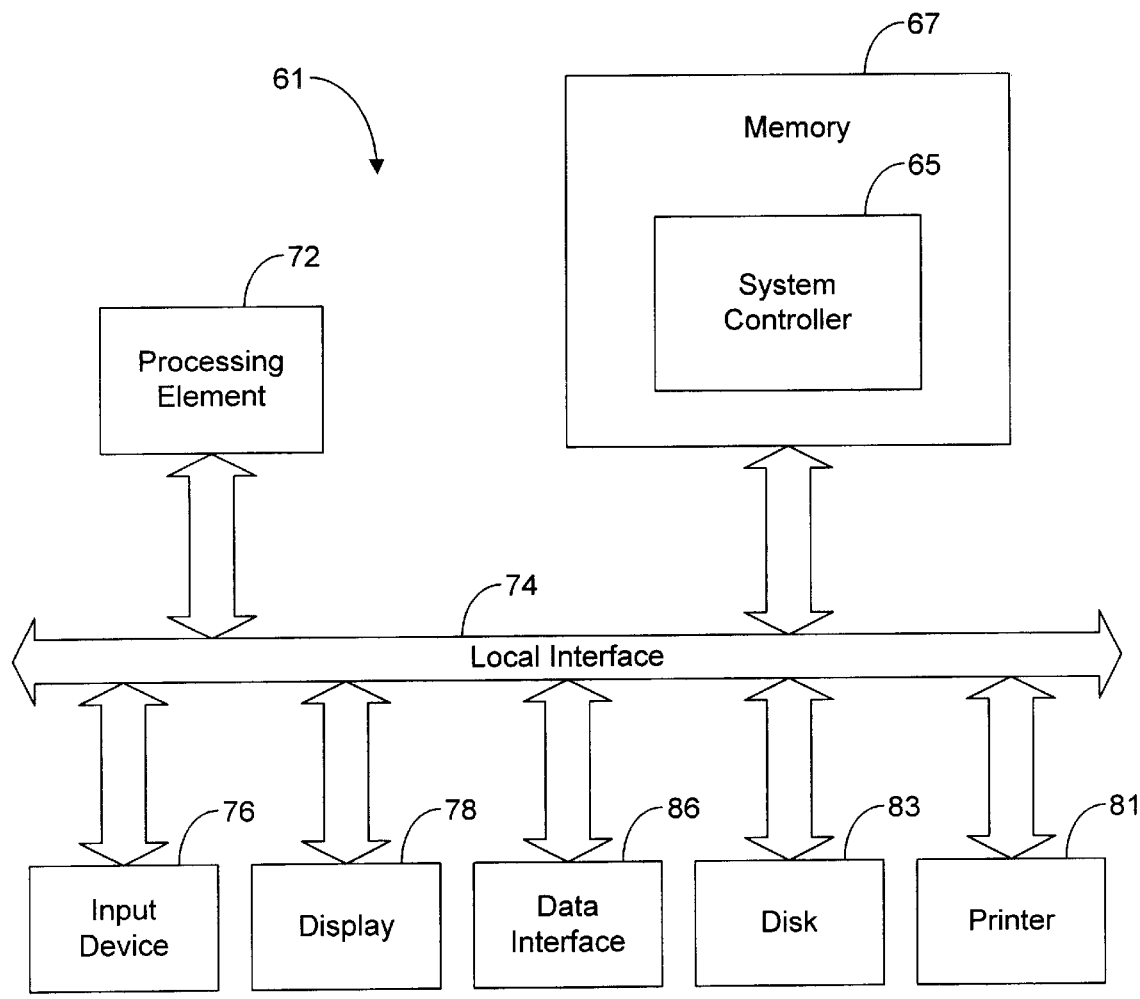
FIG. 3 is a block diagram illustrating a computer system that may be used in downloading data files from the scanning system of FIG. 1.

Once the data files 52 have been defined and stored in memory 27, it may be desirable to download one or more of the data files 52 to an external computer system, such as the computer system 61 shown by FIG. 3. Referring to FIG. 3, the computer system 61 may include a system controller 65 for controlling the operation of the system 61. Similar to the system controller 24 of FIG. 1, the system controller 65 can be implemented in software, hardware, or a combination thereof, but in the preferred embodiment, the system controller 65 along with its associated methodology is implemented in software and stored in memory 67.

The preferred embodiment of the computer system 61 of FIG. 3 comprises one or more conventional processing elements 72, such as a digital signal processor (DSP), that communicate to and drive the other elements within the system 61 via a local interface 74, which can include one or more buses. Furthermore, an input device 76, for example, a keyboard or a mouse, can be used to input data from a user of the system 61, and display device 78, such as a monitor, or a printer 81 can be used to output data to the user. A disk storage mechanism 83 can be connected to the local interface 74 to transfer data to and from a nonvolatile disk (e.g., magnetic, optical, etc.). The system 61 can be connected to a data interface 86 that allows the system 61 to exchange data with external systems, such as the scanning system 20 (FIG. 1), for example.

Referring to FIGS. 1 and 3, to selectively download data files 52 from scanning system 20 to computer system 61, the system controller 24 is preferably configured to transmit a portion 52a of the data from each of the data files 52 and the identifier associated with each of the data files 52 to the system 61 via interfaces 37 and 86, through techniques known in the art. The portion 52a of data transmitted from each file 52 is preferably sufficient for displaying a thumbnail image of the larger image defined by the data file 52. In this regard, a thumbnail image is a smaller version of a corresponding image. Because the thumbnail image is smaller, the thumbnail image can be defined with less data than the corresponding image and can, therefore, be transmitted faster. In other words, since the portion 52a of data transmitted from each file 52 is less than the total amount of data that is stored in each of the files 52, the transmission of portions 52a to generate thumbnail images is much faster than the transmission of data files 52.

It should be noted that the concept of thumbnail images is well known in the art, and one skilled in the art should understand how to generate a thumbnail image from data that defines a corresponding image larger than the thumbnail image. For example, U.S. Pat. No. 5,761,655, entitled "Image File Storage and Retrieval System" and filed on Mar. 10, 1994, which is incorporated herein by reference, describes a system that creates and displays thumbnail images.

Upon receiving the portions 52a transmitted from scanning system 20, the computer system 61 displays the thumbnail images and the identifiers defined by the transmitted data. For example, the computer system 61 can be configured to render the data via display device 78, or the system 61 can be configured to render the data via printer 81. When rendering the data via display device 78, the display device 78 preferably displays the thumbnail images and the identifiers associated with the thumbnail images. When rendering the data via printer 81, the printer 81 preferably prints a page or pages including the thumbnail images and the identifiers. Furthermore, in rendering the data, the thumbnail images and the identifiers are preferably correlated so that the user can determine which identifier is associated with which thumbnail image.

The user views the displayed images and selects at least one of the thumbnail images via input device 36. For example, if a desired thumbnail image is associated with the identifier "5," the user may enter the number "5" via input device 36 to select the desired thumbnail image. In response to the user's input, the system controller 24 determines that the data file 52 associated with the selected identifier (e.g., the number "5" in the foregoing example) should be downloaded.

In an alternative embodiment, the user can select which file 52 to download by activating the "previous" button 58 and/or "next" button 57 until the display device 55 displays the identifier (e.g., the number "5" in the foregoing example) associated with the file 52 to be downloaded. Once the display device 55 displays the appropriate identifier (i.e., the identifier associated with the file 52 to be downloaded), the user can activate a "download" button 87 (FIG. 2) that is included in the input device 36. In response, the system controller 24 selects the file 52 to be downloaded based on the identifier displayed by the display device 55, when the "download" button 87 was activated. Therefore, the selected file 52 is associated with the identifier (e.g., the number "5" in the foregoing example) displayed by the display device 55 when the "download" button 87 is activated.

Once the system controller 24 determines which file 52 should be downloaded, the system controller 24 is configured to transmit the data file 52 to computer system 61 via interfaces 37 and 86. If desired, the system controller 24 may delete the downloaded data file 52 from memory 27. The computer system 61 is configured to receive the data defining the data file 52 from scanning system 20 and to process the data through conventional processing techniques. For example, the downloaded data file 52 may be stored in memory 67, and/or the data file 52 may be rendered by display device 78 and/or printer 81.

In an alternative embodiment, the data file 52 transmitted from scanning system 20 may be communicated directly with printer 81, which is coupled to computer system 61 or is in a stand-alone configuration. For example, it may be possible to couple the data interface 37 with the printer 81 and to transmit the identifiers and the portions 52a defining thumbnail images for each of the data files 52 to the printer 81. The printer 81 then displays (i.e., prints) the thumbnail images and the identifiers, which are appropriately correlated with the thumbnail images on the printed page(s). The user then selects one of the thumbnail images and inputs the identifier associated with the selected thumbnail image into scanning system 20 via input device 36, as described hereinabove. In response, the system controller 24 determines that the data file 52 associated with the inputted identifier should be downloaded to printer 81 and transmits this data file 52 to the printer 81. The printer 81 then displays (i.e., prints) the image defined by the downloaded data file 52.

It should be noted that the printer 81 and the data interface 37 may be configured to transmit the aforementioned data without a physical connection coupled between the printer 81 and the data interface 37. For example, the printer 81 and the data interface 37 may be configured to transmit the data via wireless signals. Examples of wireless signals include, but are not limited to, infrared signals, cellular signals, radio frequency (RF) signals, etc. Accordingly, the interface 37 may include wireless transmitters for transmitting the data through techniques well known in the art, and the printer 81 may include wireless receivers for receiving the data through techniques well known in the art.

It should be further noted that it is not necessary for thumbnail images for each of the data files 52 stored in memory 27 to be rendered. If desired, the user may select which of the data files 52 are used to produce thumbnail images. In this regard, the user may provide inputs via input device 36 indicating which of the data files 52 should be used to produce thumbnail images. For example, the user via input device 36 may select (i.e., enter or otherwise identify) the identifiers associated with the data files 52 that are to be used to produce a thumbnail image. Instead of transmitting a portion 52a from each file 52 stored in memory 27 to define the thumbnail images, the system controller 24 is designed to transmit a portion 52a only from each of the files 52 associated with the identifiers selected by the user. Therefore, only thumbnail images associated with the selected data files 52 are rendered. The user can then select from these thumbnail images to download at least one of the data files 52 via the techniques described herein.

OPERATION

The preferred use and operation of the scanning system 20 and associated methodology are described hereafter.

Figure 4:
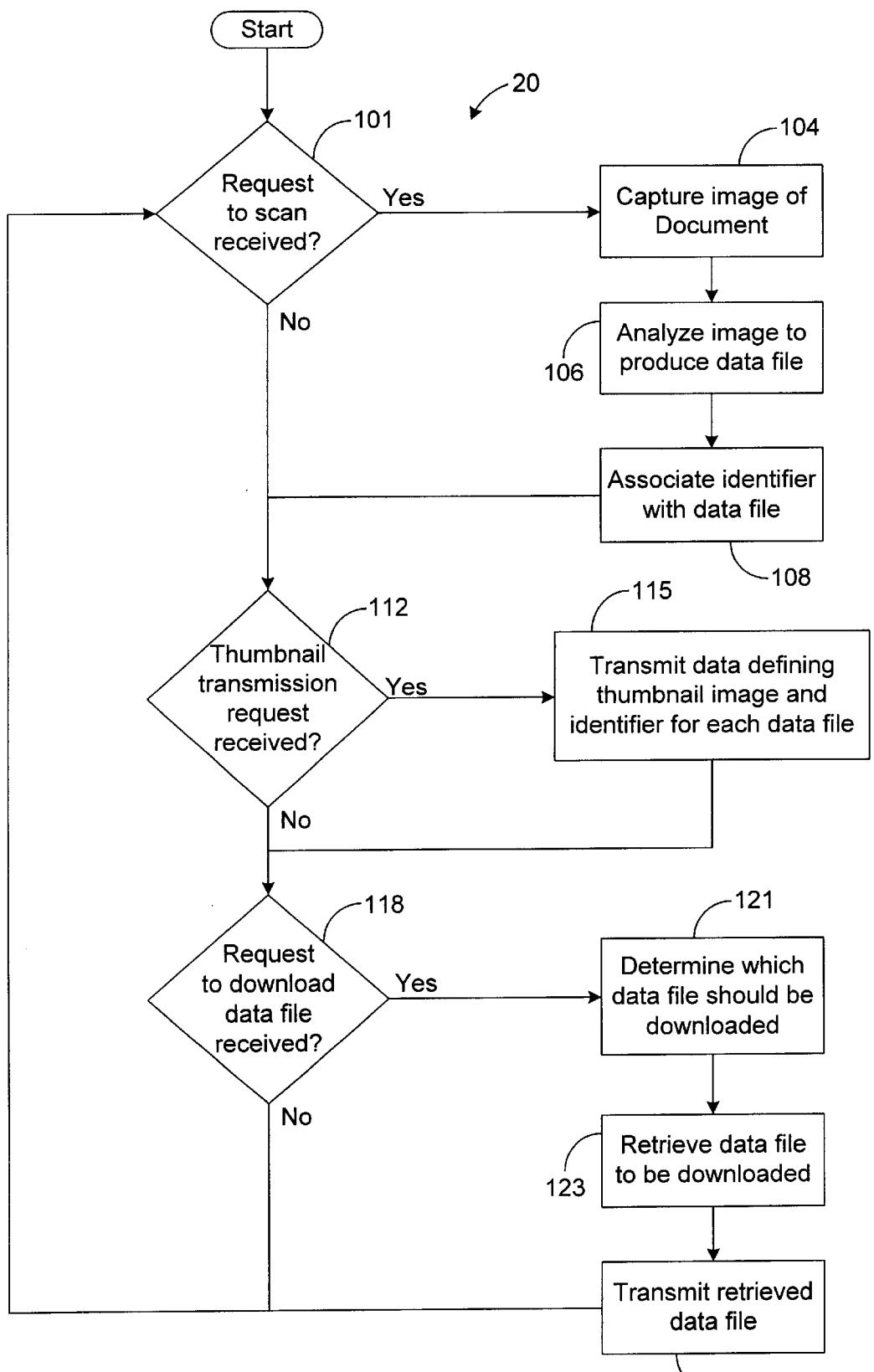
FIG. 4 is a flow chart illustrating the architecture and functionality of the scanning system of FIG. 1.

Assume for illustrative purposes that ten images are separately captured by scanning mechanism 42 in blocks 101 and 104 of FIG. 4. The translator 45 analyzes the images and produces a data file 52 for each captured image, as shown by block 106. Furthermore, the system controller 24 associates an identifier with each data file 52, as depicted by block 108. In the preferred embodiment, each data file 52 produced by translator 45 is consecutively assigned a number "1" through "10." For example, the first data file 52 produced by the translator 45 is associated with the number "1," the second data file 52 produced by the translator 45 is associated with the number "2," the third data file 52 produced by the translator 45 is associated with the number "3", etc. In other embodiments, the data files 52 can be associated with different numerical and/or non-numerical identifiers.

After generating the data files 52, assume that it is desirable to download the seventh data file 52 produced by the translator 45 (i.e., the data file 52 associated with the number "7" in the preferred embodiment) to the computer system 61 or printer 81. Therefore, the user generates a thumbnail transmission request by activating a "generate thumbnails" button 92, which is included in the input device 36. In response, the system controller 24 transmits sufficient data from each data file 52 so that thumbnail images corresponding respectively with each data file 52 and the identifier respectively associated with each data file 52 can be displayed, as shown by blocks 112 and 115. The printer 81 receives this data and utilizes this data to print out the thumbnail images and the identifiers for each of the data files 52 on a sheet(s) of paper. Each thumbnail image and identifier is preferably displayed so that the user can determine which identifier is associated with which thumbnail image.

The user analyzes the thumbnail images and identifies the thumbnail image that is defined by the data file 52 that is to be downloaded (i.e., the data file 52 associated with the number "7" identifier in the example described hereinbefore). Therefore, the user activates the "next" button 57 and/or the "previous" button 58 in the input device 36 until the display device 55 displays the number "7." Then, the user activates the "download" button 87 to request the system 20 to download a data file 52. In response, the system controller 24 determines that the number "7" is being displayed by the display device 55 and, therefore, determines that the data file 52 associated with the number "7" should be downloaded, as shown by blocks 118 and 121. The system controller 24 then retrieves the data defining the data file 52 associated with the number displayed by the display device 55 (i.e., the number "7") and transmits this data directly to the printer 81, as depicted by blocks 123 and 126. At this point, the data file 52 associated with the number "7" identifier is considered to be downloaded to the printer 81, and the printer 81 can manipulate or process the downloaded data as desired through techniques well known in the art. For example, in the preferred embodiment, the printer 81 prints out the image defined by the downloaded data file 52 to the user.

If desired, the user may delete the downloaded data file 52. In this regard, the user activates the "delete" button 59 while the display device 55 is displaying the number "7." In response, the system controller 24 determines that the data file 52 associated with the number "7" should be deleted, and the system controller 24 deletes this data file 52 from memory 27. Then, the system controller 24 decrements each identifier having a higher number than the identifier of the deleted data file 52. Therefore, the identifiers having numbers "8," "9," and "10" are decremented to "7," "8," and "9," respectively. Consequently, the remaining data files 52 are associated with identifiers having numbers "1" through "9," consecutively.

While the operation of the present invention has been discussed hereinabove as communicating data from system 20 directly to printer 81, it should be noted that it is also possible to communicate the data with computer system 61. In this regard, the system controller 24 transmits portions 52a and identifiers to the computer system 61 instead of the printer 81 in response to a thumbnail transmission request. The system controller 65 then renders this transmitted data to the user via display 78, printer 81, or some other suitable device. After selecting one of the data files 52 to download in response to a download request, the system controller 24 transmits the selected data file 52 to the computer system 61 or printer 81, which manipulates the downloaded data file 52 through techniques known in the art. For example, the system controller 24 may transmit the selected data file 52 to computer system 61, which renders the data file 52 to the user via display 78.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

Now, therefore, the following is claimed:

1. An optical scanner that enables data to be efficiently and selectively downloaded from said scanner, comprising:
   a scanning mechanism configured to scan images of documents as said scanner is being swiped across said documents;
   a translator configured to produce data files, each of said data files defining one of said scanned images, said data files respectively associated with identifiers;
   a data interface configured to communicate with a device external to said scanner;
   a display device configured to display said identifiers;
   a user input device configured to receive user inputs, one of said user inputs for selecting one of said displayed identifiers; and
   a system controller configured to transmit sets of image data to said external device via said data interface, each of said sets comprising an image of one of said identifiers and a thumbnail image of one of said scanned images defined by one of said data files, said system controller configured to download, via said data interface and in response to said one user input, data from one of said data files identified by said selected identifier.

2. The scanner of claim 1, wherein said system controller is configured to download said data from said one data file identified by said selected identifier in response to a determination, by said system controller, that said selected identifier is being displayed by said display device when said one user input is received by said user input device.

3. The scanner of claim 1, wherein said system controller is configured to transmit each of said sets of image data to said external device, via said data interface, in response to one of said user inputs.

4. The scanner of claim 1, wherein said display device is configured to display said identifiers without displaying images of said documents.

5. A scanning method for enabling data to be efficiently and selectively downloaded from an optical scanner, comprising:
   using said scanner to scan images of documents;
   respectively associating said scanned images with identifiers;
   displaying said identifiers via a display device of said scanner;
   transmitting sets of image data from said scanner to an external device, each of said sets comprising an identifier and a thumbnail version of one of said scanned images;
   displaying each of said sets of image data via said external device;
   selecting one of said sets of image data displayed by said external device;
   correlating an identifier of said selected set of image data with one of said identifiers displayed by said display device; and
   downloading from said scanner, based on said correlating, image data defining one of said scanned images.

6. The method of claim 5, wherein said displaying said identifiers is performed without displaying images of said documents via said display device.

7. The method of claim 5, wherein said correlating comprises providing, via a user input device of said scanner, a user input for selecting said correlated identifier displayed by said display device, and wherein said downloading is performed in response to said user input.

8. The method of claim 7, further comprising determining that said correlated identifier displayed by said display device is being displayed by said display device when said user input is received by said input device, wherein said downloading is performed in response to said determining.

* * * * *